(12) United States Patent
Dyderski

(10) Patent No.: US 7,595,449 B1
(45) Date of Patent: Sep. 29, 2009

(54) ELECTRICAL OUTLET SAFETY COVER PLATE

(76) Inventor: Mitchell Casimir Dyderski, 9326 Lake Crest Dr., Whitmore Lake, MI (US) 48189

( * ) Notice: Subject to any disclaimer, the term of this patent is extended or adjusted under 35 U.S.C. 154(b) by 0 days.

(21) Appl. No.: 12/284,642

(22) Filed: Sep. 24, 2008

(51) Int. Cl.
*H02G 3/14* (2006.01)
(52) U.S. Cl. ............................ 174/67; 174/66; 174/242; 439/136
(58) Field of Classification Search .................. 174/66, 174/67; 220/241, 242; 439/136, 145
See application file for complete search history.

(56) References Cited

U.S. PATENT DOCUMENTS

| | | | |
|---|---|---|---|
| 2,820,842 A | | 1/1958 | Meistrell |
| 3,865,456 A | | 2/1975 | Dola |
| 4,711,634 A | | 12/1987 | Antone, II et al. |
| 4,733,017 A | | 3/1988 | Wolfe-Taylor et al. |
| 4,793,818 A | | 12/1988 | Poirier |
| 4,798,916 A | | 1/1989 | Engel et al. |
| 4,857,004 A | | 8/1989 | Poirier |
| 4,952,755 A | | 8/1990 | Engel et al. |
| 5,267,870 A | * | 12/1993 | Maresh ........................ 439/139 |
| 5,998,735 A | * | 12/1999 | Patterson, Jr. ................. 174/67 |
| 6,677,525 B1 | * | 1/2004 | Walker .......................... 174/66 |
| 6,780,031 B1 | * | 8/2004 | Valls ........................... 439/147 |

OTHER PUBLICATIONS

Innovative Safety Technologies Unviels No Tug Plug Safety Plate System, Market Wire, Dec. 2001, Toronto, Canada.

* cited by examiner

*Primary Examiner*—Dhiru R Patel

(57) ABSTRACT

An electrical outlet safety cover plate assembly for an electrical outlet receptacle having at least one socket, with apertures corresponding to those in the electrical outlet receptacle for receiving the male prongs of an electrical plug. The safety cover plate, and most of the assembly being made of non-conductive material. The safety cover plate includes a single shutter per outlet plug that is slidably mounted on the back surface of the safety cover plate and has apertures that correspond to the apertures in the safety cover plate. The shutter includes a member extending outward from the shutter in a direction opposite the biasing force acting upon the shutter. The protruding member extends out thru an access opening in the safety cover plate for manual positioning of the shutter. A biasing element acts upon the shutter to normally bias the shutter in the non-aligned position, thus effectively covering to the apertures of the electrical outlet receptacle. The protruding member of the shutter must be moved in a direction opposite the biasing force and away from the cover plate to align the apertures of the shutter with the apertures in the cover plate thus allowing for insertion of an electrical plug into the outlet receptacle. When the electrical plug is retracted the shutter is repositioned into the non-aligned position by the biasing element. A younger child would have a difficult time to position and hold the shutter so that an object could be inserted into the electrical outlet receptacle. It also allows for ease of use by an adult. The aforementioned safety cover plate is also more aesthetically appealing than those currently found in the market and it would hide the unsightly electrical outlet receptacles commonly found in most homes.

9 Claims, 5 Drawing Sheets

ELECTRICAL OUTLET SAFETY COVER PLATE

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

This invention relates to an electrical outlet safety cover plate for covering an electrical outlet receptacle that protects against insertion of foreign objects into the sockets of the electrical outlet receptacle, which can thereby prevent accidental electrical shock.

2. Prior Art

There have been many accidents that happen when small children accidentally insert objects into electrical wall receptacles thus resulting in electrical shock. Most homes have the outlets that are uncovered and readily visible to children, inviting a curious child to insert an object into the openings, many times with serious consequences. Prior art discloses the many designs for electrical outlet safety covers that have been proposed through the years:

U.S. Pat. No. 4,733,017 issued to Wolfe-Taylor et al. discloses an electrical cover plate that has a pair of spring loaded shutters for each receptacle that traverse laterally in guides, and are independently positioned to align the hole in each shutter with a hole on the cover plate and electrical receptacle.

U.S. Pat. No. 4,711,634 issued to Antone II et al. discloses an electrical cover plate with independent closures that traverse vertically with each of the closures being biased to a closed position by tensioning element. The guides are in a backing plate attached to the cover plate.

U.S. Pat. Nos. 4,793,818 and 4,857,004 issued to Poirier discloses a safety guard which comprises a cover with a pair of openings adapted to be mounted over an electrical wall outlet and closure elements which are slidably mounted to the cover to expose or to cover the openings in registry with the sockets of the wall outlet.

U.S. Pat. No. 4,952,755 issued to Engel et al. discloses a safety plate for electrical outlets which includes a cover plate having apertures therein for receiving the prongs of an electrical plug. A pair of slidable panels also having apertures for the prongs of a plug are mounted to the back of the cover plate and are held in place by a back plate.

U.S. Pat. No. 4,798,916 issued to Engel et al. discloses a safety plate for electrical outlets which includes a cover plate having a pair of openings. Slidable panels with access apertures are mounted on the back of the cover plate by a back plate that has apertures corresponding to the outlet receptacle.

U.S. Pat. No. 2,820,842 issued to Meistrell discloses an electrical cover plate having an opening for access to the electrical receptacle. A pair of slidable panels with access apertures are mounted on the back of the cover plate by a back plate that has openings corresponding to the outlet receptacle.

U.S. Pat. No. 3,865,456 issued to Dola discloses a cover plate having a pair of openings. A pair of slidable panels with access apertures are mounted on the back of the cover plate by dovetail grove in the cover plate.

Although there have been many solutions proposed to minimize the potential for electrical shock from the insertion of objects into electrical outlet receptacles by smaller children, many have proven cumbersome in there application by adults. There are some cover plates that utilize a movable shutter on the exterior of the cover plate that require the insertion of the electrical prongs to manipulate the shutter into an aligned position. A small child can place an object into the shutters apertures, which are just as inviting as an open socket, and slide the cover over. Also many of these proposals are at least as unsightly as the electrical outlet receptacles that they cover. The most successful solution to date for limiting a child's access to electrical outlet receptacles has been a simple plastic plug cover that is inserted directly into the electrical outlet receptacle. Unfortunately these same plug covers are also very difficult for an adult to remove, can be easily misplaced, and present a choking hazard for younger children. There has been a limited amount of commercial success with safety cover plates that offer some type of protection for children and ease of use by adults.

The object of the described embodiment of the invention is to provide an aesthetically appealing, yet effective means of limiting a younger child's access to the electrical outlet receptacle as well as providing a safety cover plate that can be easily used by an adult.

SUMMARY

An electrical outlet safety cover plate assembly for an electrical outlet receptacle having at least one socket with apertures for receiving the male prongs of an electrical plug comprising of a safety cover plate made of nonconductive material having apertures corresponding and aligned with the apertures in the electrical outlet receptacle. The cover plate assembly includes at least one shutter made of nonconductive material having apertures corresponding to the apertures in the cover plate with the shutter being slidably mounted on the back surface of the cover plate. The cover plate assembly includes at least one biasing element providing a means of exerting force on the shutter. The biasing element acts upon the shutter to normally bias the shutter in the non-aligned position, thus effectively covering the apertures of the electrical outlet receptacle. The shutter also having a member extending outward from the shutter in a direction opposite the biasing force acting on the shutter and protruding out thru an access opening in the cover plate as a means for manual positioning of the shutter. The protruding member of the shutter must be moved in a direction away from the cover plate and opposite the biasing force to align the apertures of the shutter with the apertures in the cover plate and electrical outlet receptacle thus allowing for insertion of an electrical plug into the outlet receptacle. When the electrical plug is retracted the shutter is repositioned into the non-aligned position by the biasing element.

DRAWINGS

Figures

FIG. 1 is a front view of the safety cover plate assembly showing the protruding members of the shutters extending thru access openings on the peripheral edge of the safety cover plate. The upper shutter is shown in a normally closed position, with the extending member of the shutter adjacent to the edge of the cover plate. The lower shutter is shown positioned so that its apertures are aligned with those of the cover plate.

DETAILED DESCRIPTION

Figure 1:
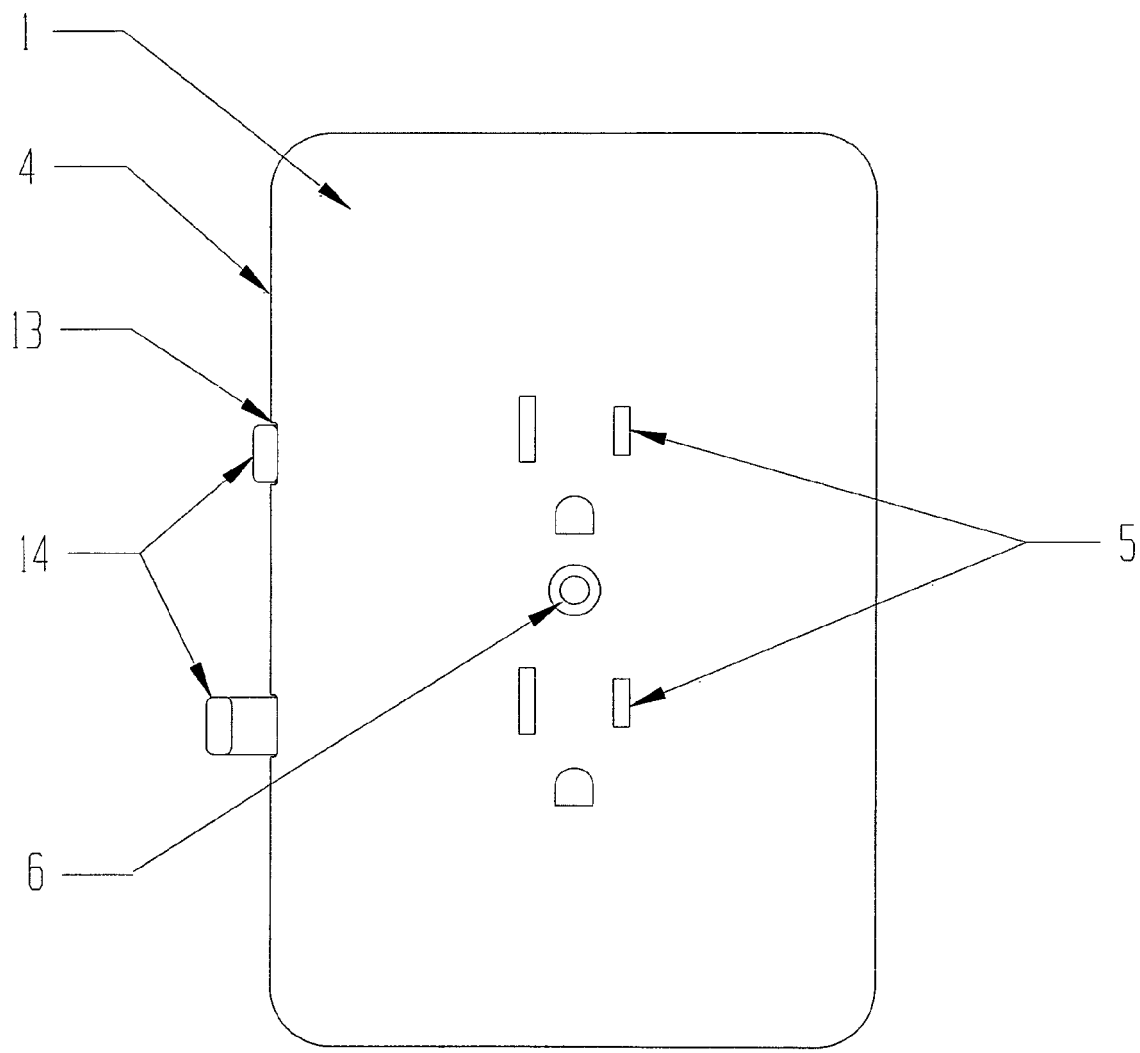
Figure 2:
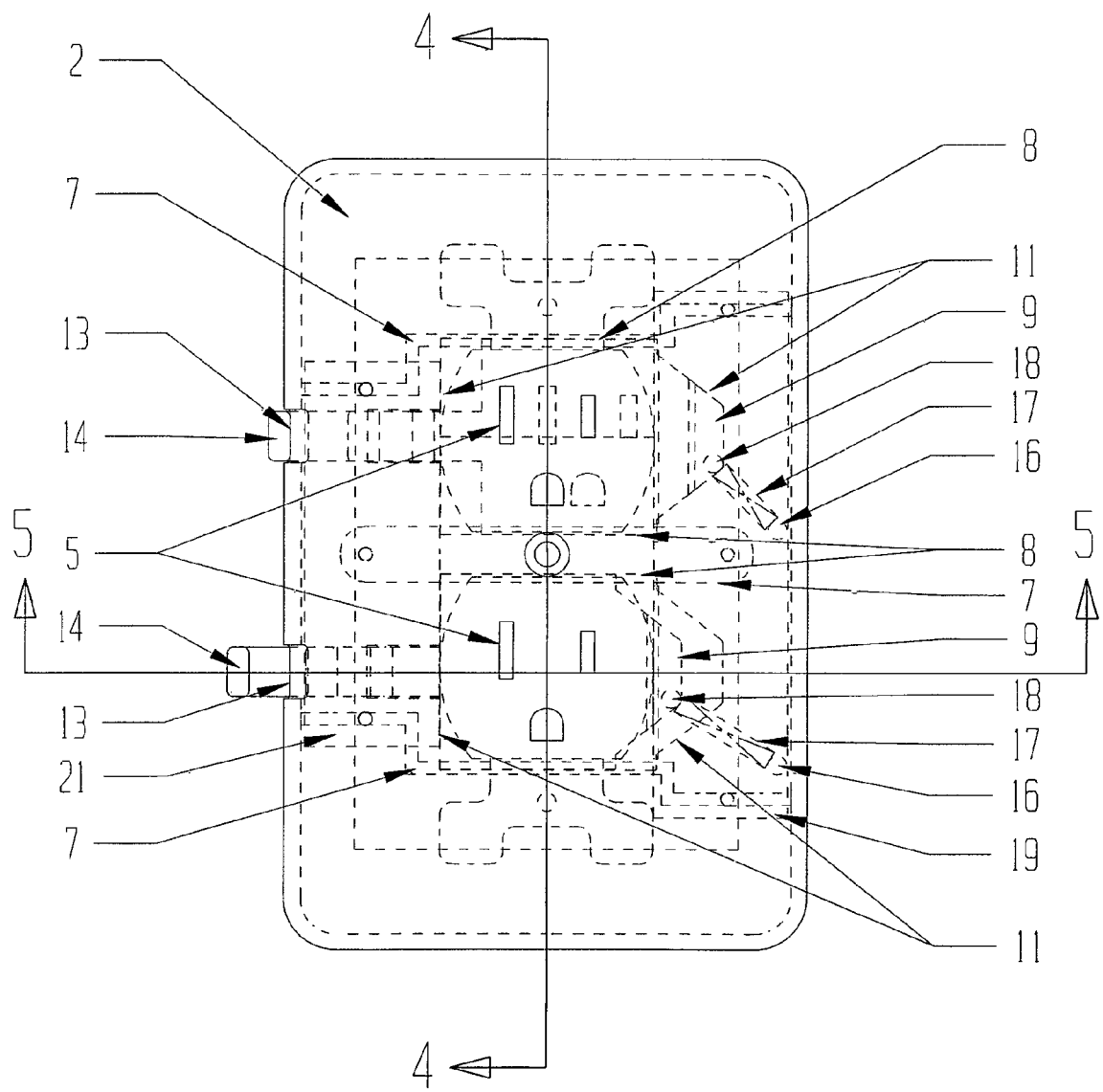
FIG. 2 is a front view of the safety cover plate assembly as attached to an electrical outlet receptacle, showing the backside features of the safety cover plate assembly as hidden lines.
Figure 3:
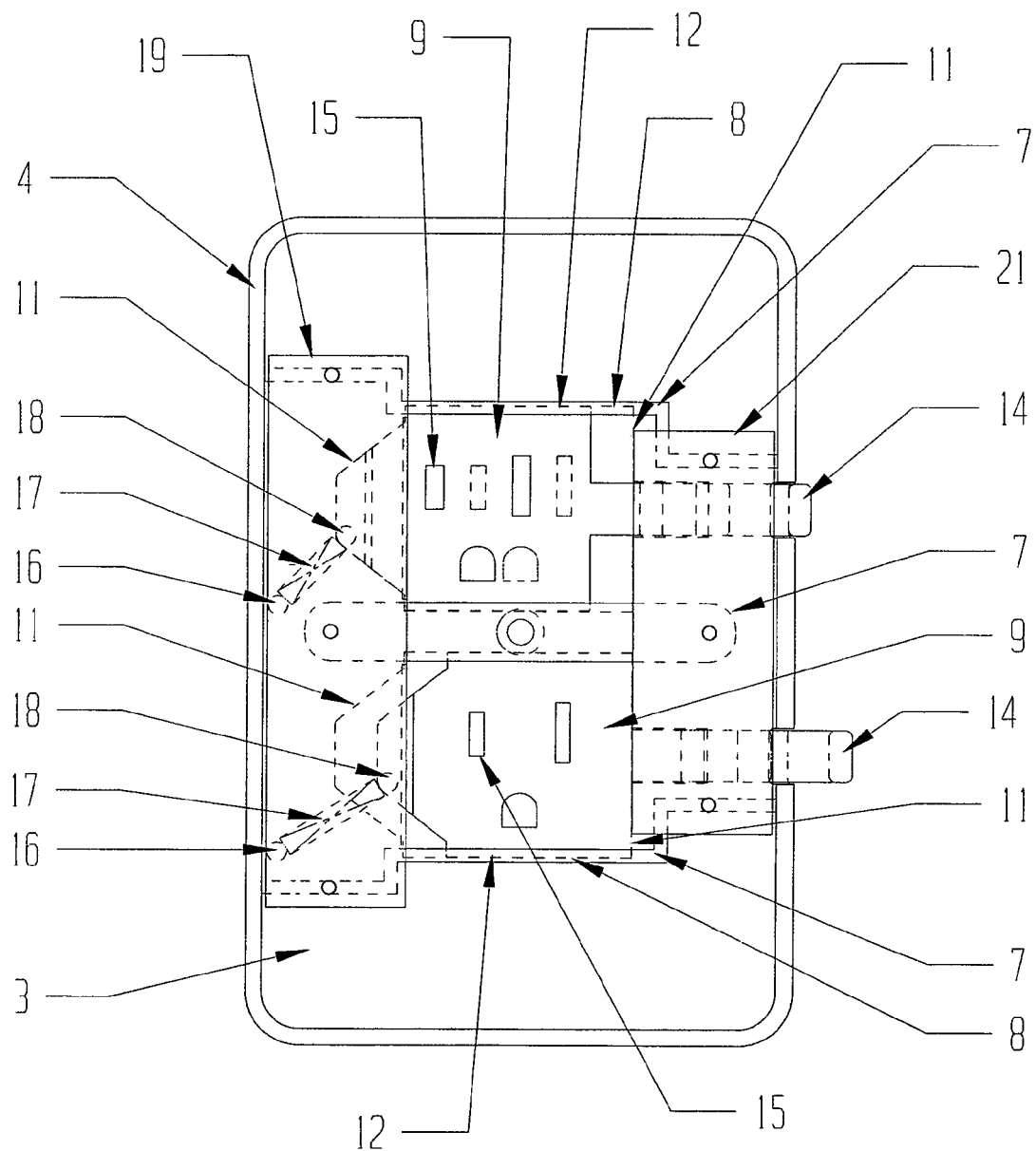
FIG. 3 is a rearward view of the safety cover plate assembly.
Figure 4:
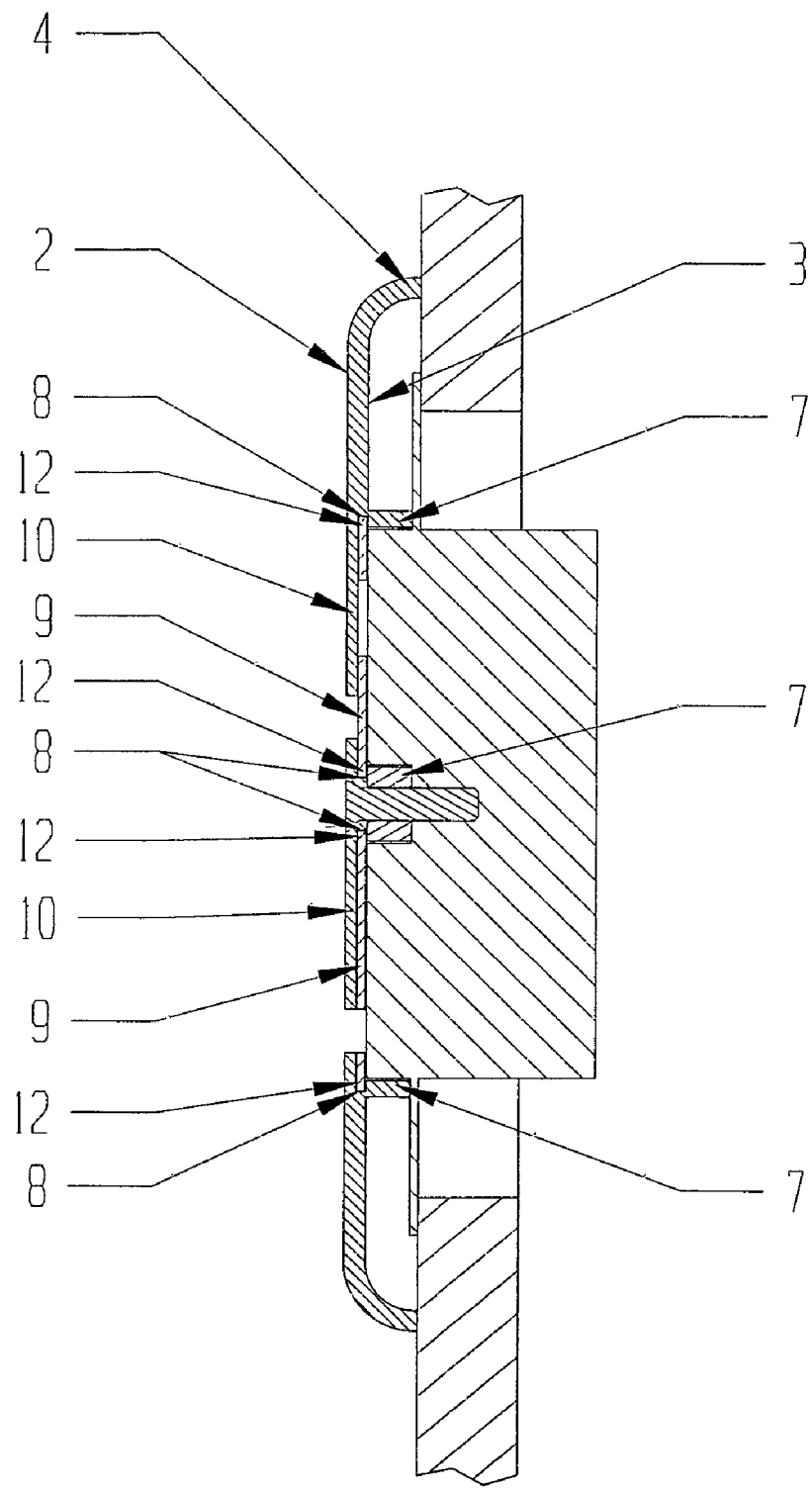
FIG. 4 is a vertical section of the of the safety cover plate assembly taken along line 4-4 of FIG. 2.
Figure 5:
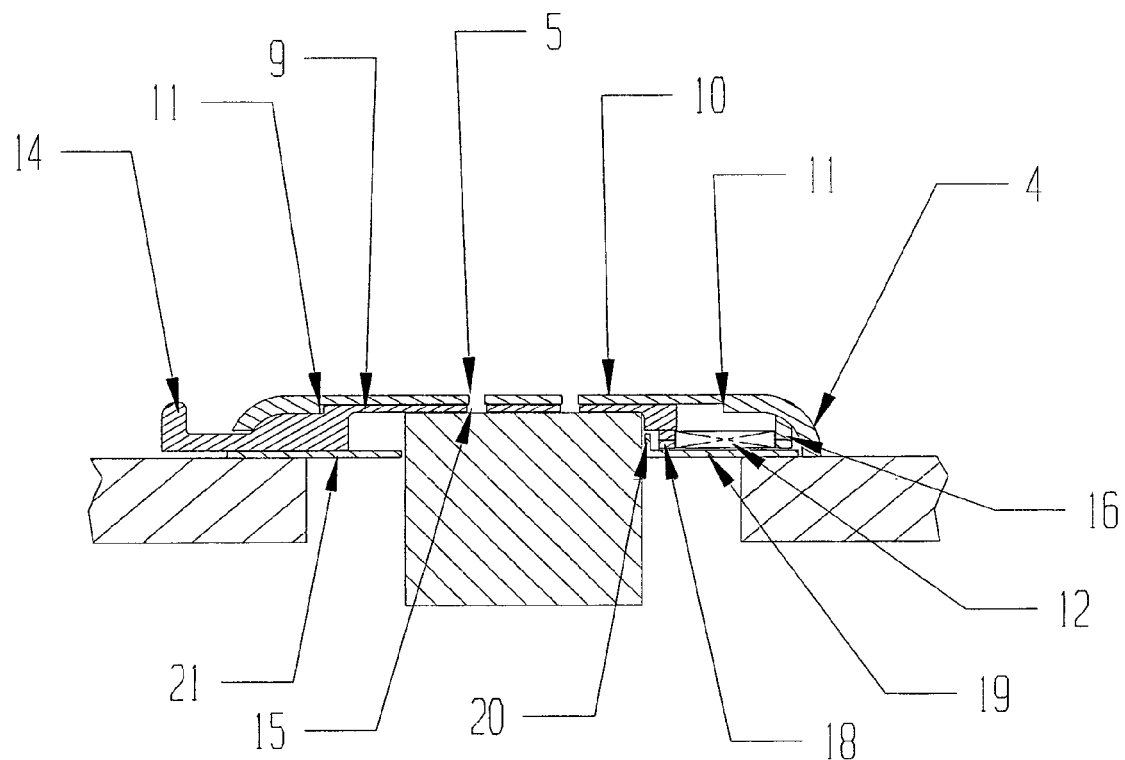
FIG. 5 is a horizontal section of the safety cover plate assembly taken along line 5-5 of FIG. 2.

Preferred Embodiments—FIGS. 1-5

Referencing the drawings contained herein, the corresponding parts being identified numerically the same as those in the following description. FIG. 1, FIG. 2, FIG. 3, FIG. 4, and FIG. 5, show the safety cover plate 1 as well as all the features described below.

An electrical outlet safety cover plate 1 having a front surface 2 and a back surface 3 with a peripheral edge 4 of safety cover plate 1 extending rearward toward the wall. Safety cover plate 1 is made of a non-conductive material and attaches to an electrical outlet receptacle having at least one outlet plug or variances thereof (a typical dual outlet receptacle is shown in the drawings) with apertures 5 for accepting the electrical chord plug's male prongs for each outlet in the receptacle. Safety cover plate 1 also includes at least one screw aperture 6 as a means of attaching and removing safety cover plate 1 to the electrical outlet receptacle. Cover plate 1 also includes at least one shutter access opening 13 being located on peripheral edge 4 which a protruding member 14 of shutter 9 extends out thru for manual operation of shutter 9 by a pulling motion independently of any other shutter 9 that may be present.

Non-visible back surface 3 of safety cover plate 1 will have multiple ribs 7 that are integral to safety cover plate 1 and have slots 8 formed in or by ribs 7 for retaining a sliding single shutter 9 for each outlet plug in the receptacle, as well as allowing independent movement of each shutter 9. Ribs 7 along with the attaching screws locate safety cover plate 1 onto the electrical outlet receptacle for proper positioning of apertures 5, as well a maintaining the proper distance of back surface 3 and shutter 9 to each outlet plug in the receptacle so as to not impede movement of shutter 9.

Back surface 3 may also have an area of minimal thickness 10 between the ribs 7 retaining shutter 9 to allow for maximum insertion of the electrical chord plug's prongs into the outlet receptacle plug and to allow for overall minimal depth of the safety cover plate 1. Localized features 11 are included on back surface 3, for and aft of shutter 9 in the direction of its movement, that protrude above the plane that shutter 9 traverses on that function to limit the travel of shutter 9.

Shutter 9 is comprising of outboard edges 12 that are retained by slots 8 in ribs 7 to allow for movement of shutter 9. Shutter 9 includes apertures 15 that correspond to apertures 5 in safety cover plate 1. Shutter 9 also having a protruding member 14 that extends outward from shutter 9 in a direction opposite of the biasing force acting upon the shutter 9. The protruding member 14 extends out thru an access opening 13 on peripheral edge 4 in the cover plate 1 as a means for manual positioning of the shutter 9. The protruding member 14 of the shutter 9 must be moved in a direction opposite of the biasing force and away from the cover plate 1 to align the apertures 15 of the shutter 9 with the apertures 5 in the cover plate 1.

Back surface 3 of safety cover plate 1 includes at least one feature 16 to attach a biasing element 17 to. The opposite end of biasing element 17 is attached to a feature 18 on shutter 9 thus biasing shutter 9 so that apertures 15 in the shutter 9 are in a non-aligned position with apertures 5 in safety cover plate 1.

At least one backing cover plate 19 is attached across ribs 7 and adjacent to peripheral edge 4 of safety cover plate 1 to contain biasing element 17. Backing cover plate 19 includes a lip 20 that extends towards back surface 3 of safety cover plate 1 in the area between ribs 7 to further protect biasing element 17.

At least one backing cover plate 21 is attached across ribs 7 and adjacent to peripheral edge 4 and access opening 13 of safety cover plate 1 to provide a support for protruding member 14 of shutter 9.

All the components of the safety cover plate assembly described above, except for possibly the biasing element, can be injection molded from various plastic materials using the typical manufacturing methods common to the industry for making such tooling.

Operation

In the embodiment of safety cover plate 1 described above, the protruding member 14 of the shutter 9 must be moved in a direction away from the cover plate 1 and opposite of the biasing force acting upon the shutter 9 by a pulling motion to align the apertures 15 of the shutter 9 with the apertures 5 in cover plate 1, thus allowing for insertion of an electrical plug into the outlet receptacle. When the electrical plug is retracted, the shutter 9 is repositioned into the non-aligned position by the biasing element 17 thereby obstructing access to the apertures in the electrical outlet receptacle.

Advantages

The main objective of the embodiment described above is to provide an electrical outlet safety cover plate that is aesthetically appealing as well a providing a practical and functional means of covering an electrical outlet receptacle's apertures from access by infants and younger children. The safety cover plate described above does this by normally biasing each shutter into a non-aligned position whenever the outlet receptacle is not in use. The protruding member of the shutter is located adjacent to the peripheral edge of the cover plate when the shutter is biased in the non-aligned position, so that it is not as noticeable and offers a more streamlined design that will not attract the attention of a younger child. These attributes allow for a safety cover plate that cannot be easily manipulated by younger children. A younger child would have a difficult time to position and hold the shutter so that an object could be inserted into the electrical outlet receptacle. The design of the safety cover plate assembly allows for an adult to easily move each shutter independently so that shutter is in an aligned position for insertion of an electrical plug. The safety cover plate is also more aesthetically appealing than those currently found in the market and it would hide the unsightly electrical outlet receptacles commonly found in most homes.

CONCLUSIONS, RAMIFICATIONS, AND SCOPE

Thus the reader will see that the electrical outlet safety cover plate as described above has defined advantages in limiting a younger child's access to the electrical outlet plugs by normally biasing the shutter closed as well as making it more difficult to notice and manipulate the shutters. The embodiment described also allow for an adult to easily move the shutters in the cover plate for insertion of an electrical plug.

The electrical outlet safety cover is also more aesthetically appealing than those currently found in the market. They can be easily manufactured at a low cost using basic injection molding principals and can be decorated by using techniques that are common to the industry.

While the above description contains many specifics, these should not be construed as to limiting the scope of the described embodiment, but rather as an example of the preferred embodiment. Thus the scope of the embodiments should be determined by the appended claims and their legal equivalents.

I claim:

1. An electrical outlet safety cover plate assembly for an electrical outlet receptacle having at least one socket with apertures for receiving the male prongs of an electrical plug comprising of:
    a safety cover plate made of nonconductive material having a front surface and a back surface with the peripheral edge projecting rearwards;
    said cover plate having at least one aperture for a screw as a means of attaching and removing said cover plate to the electrical outlet receptacle;
    said cover plate having apertures corresponding and aligned with the apertures in the electrical outlet receptacle;
    at least one shutter made of nonconductive material having apertures corresponding to said apertures in said cover plate;
    said shutter having a means of being slidably mounted on said back surface of said cover plate;
    at least one biasing element exerting a force on said shutter so that said apertures of said shutter are in a non-aligned position with said apertures in said cover plate in the normally biased closed position;
    said cover plate including at least one opening on said peripheral edge of said cover plate as a means of access to said shutter;
    said shutter having a protruding member extending outward in a direction opposite of the biasing force acting upon the shutter;
    said protruding member of said shutter extending out thru said access as a means to manually position said shutter by a pulling motion so that said apertures of said shutter are in an aligned position with said apertures of said cover plate.

2. The safety cover plate of claim 1, wherein ribs that are attached to said cover plate are approximately the depth of the outlet receptacle socket and adjacent to the outlet receptacle socket in order to position and locate said cover plate to the electrical outlet receptacle.

3. The safety cover plate of claim 1, wherein said back surface of said cover plate in area that said shutter traverses to have a minimal thickness to allow for maximum insertion of the male prongs of said electrical plug and to minimize depth of said cover plate.

4. The safety cover plate of claim 1, wherein the said back surface of said cover plate having features for and aft of said apertures in said cover plate that protrude past a plane that said shutter traverses on to limit the travel of said shutter.

5. The safety cover plate of claim 1, wherein the said back surface of said cover plate has at least one feature to retain said at least one biasing element.

6. The safety cover plate of claim 1, wherein said shutter has at least one feature to retain said at least one biasing element.

7. The safety cover plate of claim 1, further including at least one backing cover plate attached to said cover plate and adjacent to said peripheral edge to contain said biasing element.

8. The safety cover plate of claim 7, wherein said backing cover plate includes a lip that extends towards said back surface of said cover plate to further protect and enclose said biasing element.

9. The safety cover plate of claim 1, further including at least one backing cover plate attached to said cover plate and adjacent to said peripheral edge to provide support for said protruding member of said shutter.

* * * * *